(12) United States Patent
Bhatia et al.

(10) Patent No.: US 7,602,893 B2
(45) Date of Patent: Oct. 13, 2009

(54) METHOD AND SYSTEM FOR SUPPORTING RENDEZVOUS BASED INSTANT GROUP CONFERENCING AMONG MOBILE USERS

(76) Inventors: Randeep Bhatia, 150 Wallace Ct., Green Brook, NJ (US) 08812; Jorge Lobo, 1 Washington, Square Village #8-1, New York, NY (US) 10012; Guda Venkatesh, 167 Clarken Dr., West Orange, NJ (US) 17052

( * ) Notice: Subject to any disclaimer, the term of this patent is extended or adjusted under 35 U.S.C. 154(b) by 1119 days.

(21) Appl. No.: 10/431,338

(22) Filed: May 7, 2003

(65) Prior Publication Data

US 2004/0001446 A1 Jan. 1, 2004

Related U.S. Application Data

(60) Provisional application No. 60/378,379, filed on May 7, 2002.

(51) Int. Cl.
*H04M 3/42* (2006.01)
*H04L 12/16* (2006.01)
(52) U.S. Cl. .................. 379/202.01; 455/416; 370/260
(58) Field of Classification Search ............ 379/203.01; 455/416; 370/260
See application file for complete search history.

(56) References Cited

U.S. PATENT DOCUMENTS

| | | | | |
|---|---|---|---|---|
| 5,124,912 A * | 6/1992 | Hotaling et al. ................ 705/9 |
| 6,148,068 A * | 11/2000 | Lowery et al. ......... 379/202.01 |
| 6,275,575 B1 * | 8/2001 | Wu ....................... 379/202.01 |
| 6,600,725 B1 * | 7/2003 | Roy ............................ 370/261 |
| 6,879,678 B1 * | 4/2005 | Lang ........................... 379/219 |
| 2002/0078153 A1 * | 6/2002 | Chung et al. ................ 709/204 |
| 2006/0088152 A1 * | 4/2006 | Green et al. ........... 379/202.01 |
| 2006/0177034 A1 * | 8/2006 | Reding et al. .......... 379/211.02 |
| 2007/0115348 A1 * | 5/2007 | Eppel et al. .............. 348/14.08 |
| 2008/0037748 A1 * | 2/2008 | Jefferson et al. ........ 379/202.01 |
| 2008/0084984 A1 * | 4/2008 | Levy et al. ............. 379/202.01 |
| 2008/0132215 A1 * | 6/2008 | Soderstrom et al. ......... 455/416 |
| 2008/0165944 A1 * | 7/2008 | Rosenthal et al. ...... 379/202.01 |

* cited by examiner

*Primary Examiner*—Curtis Kuntz
*Assistant Examiner*—Joseph T Phan
(74) *Attorney, Agent, or Firm*—Baker Botts L.L.P.

(57) ABSTRACT

A method and a system for supporting rendezvous based instant group conferencing among mobile users allows a conference originator to initiate and setup instant group conferencing to a set of participants even when the participants may not be immediately available to commit to the conference call at the time of its initiation. All negotiations for obtaining commitments from the participants are performed by the system, thus relieving the originator of the time consuming task of negotiating with the participants. The system automatically decides as to when to actually dial out to the participants to setup the conference call after obtaining commitment from all (or a quorum of) required participants.

13 Claims, 3 Drawing Sheets

METHOD AND SYSTEM FOR SUPPORTING RENDEZVOUS BASED INSTANT GROUP CONFERENCING AMONG MOBILE USERS

CROSS REFERENCE TO RELATED APPLICATIONS

This application claims the benefit under 35 U.S.C. 119(b) of U.S. Provisional Patent Application Ser. No. 60/378,379, filed on May 7, 2002, entitled "Method and System for Supporting Rendezvous Based Instant Group Conferencing Among Mobile Users."

BACKGROUND

1. Field of Invention

The present invention relates to the provision of automated conferencing to telecommunication conference group participants, and particularly mobile telephone subscribers.

2. Description of Prior Art

Traditionally, conference calls are scheduled in advance with required participants and a conference provider. The conference provider typically requires the originator of the conference to specify in advance a time slot and the number of conference ports to be utilized (based on which the conference originator is charged appropriately for the conference call). The conference provider provides a toll free number (and possibly an identification code) that the participants use to dial in at the start time to join and participate in the conference call. These pre-arranged conference calls are thus characterized by:

(i) Each participant's pre-commitment;
(ii) Participant dial-in to participate; and
(iii) Conference calls which are of relatively long duration.

An alternative to the traditional pre-arranged conference call approach has evolved that is based on the concept of unscheduled or instant group conferencing. According to this approach, a conference originator requests a conference provider to arrange an instant conference among a group of participants. The conference provider's system dials out to each participant in order to invite them to the conference. All participants who are willing and able to participate in the conference call can answer the call and join the conference. These instant group conference calls are typically characterized by:

(i) Participant commitment by answering the conference call;
(ii) Conference invitations by dialing out to the participants; and
(iii) Conference calls that are of relatively short duration.

A problem inherent in the instant group conferencing model is that a required participant may not be able to commit to the conference invitation at the moment when the system initiates the conference call. This may be due to many reasons, such as the participant being temporarily away from the telephone, tied up with some urgent work, etc., at the moment when the participant is called. In this situation, the conference call will not be able to include the required participant and may thus be canceled, causing unnecessary intrusion for the remaining participants who are waiting on the call for others to answer. Even if the conference call is not canceled, it may not be effective due to the absence of the required participant who declined the call.

Some instant group conferencing systems, such as those based on the Session Initiation Protocol (SIP), use text message-based invitations that can invite participants to the conference call while provide context information about the conference. However, the invitations generally do not provide the participants enough advance information, such as who the other participants are, what the topic is, etc., to enable the participants to make a truly informed decision about whether to accept or decline the conference invitation at the time it is received. In addition, the acceptance of an invitation is final and there is no way for the participants to temporarily change their availability status in order to perform other tasks waiting for the conference to be established.

One proposed solution to the problems associated with instant group conferencing is for a conference originator to obtain individually from each of the participants their short-term commitment to participate in the conference before actually initiating the conference call. However, there may be situations where a participant's willingness to commit to the conference call changes over the short time period in which the individual commitments are being gathered, or at any time prior to the conference call. This may require the originator and the participants to spend a lot of time engaged in one-to-one communication to ensure that all the participants are committed to participate in the conference call, thus reducing the effectiveness of instant group conferencing.

One other existing approach to effective instant group conferencing requires participants to publish on an ongoing basis their availability to receive a voice call from the conference originator. The conference originator then initiates the conference call at the moment when all required participants publish themselves to be available to the originator. There are two issues with this approach. One is that it may be difficult for the participants to update their availability indicators so as to accurately reflect their current state. Hence, they may still not be able to commit to the conference call at the moment of receiving an invitation. Second, a participant may want to know who the other participants are before committing to the conference call and may only commit when a certain set of participants are included (or excluded).

Accordingly, there is presently a need for an alternative approach to instant group conferencing that is more effective than the above-mentioned solutions.

SUMMARY OF THE INVENTION

The present invention addresses the foregoing concerns by providing a system and related method for supporting effective instant group conferencing to mobile user groups using an automated rendezvous mechanism. According to this approach, when a conference call request is received from a conference originator, conference invitations are sent out to one or more conference participants. The responses to the conference invitations are tested over the course of a predetermined invitation period. A conference call is set up upon obtaining a quorum of conference commitments from the conference participants.

BRIEF DESCRIPTION OF THE DRAWING FIGURES

The foregoing and other features and advantages of the invention will be apparent from the following more particular description of preferred embodiments of the invention, as illustrated in the accompanying Drawings in which.

DETAILED DESCRIPTION OF EXEMPLARY EMBODIMENTS

Overview

Figure 1:
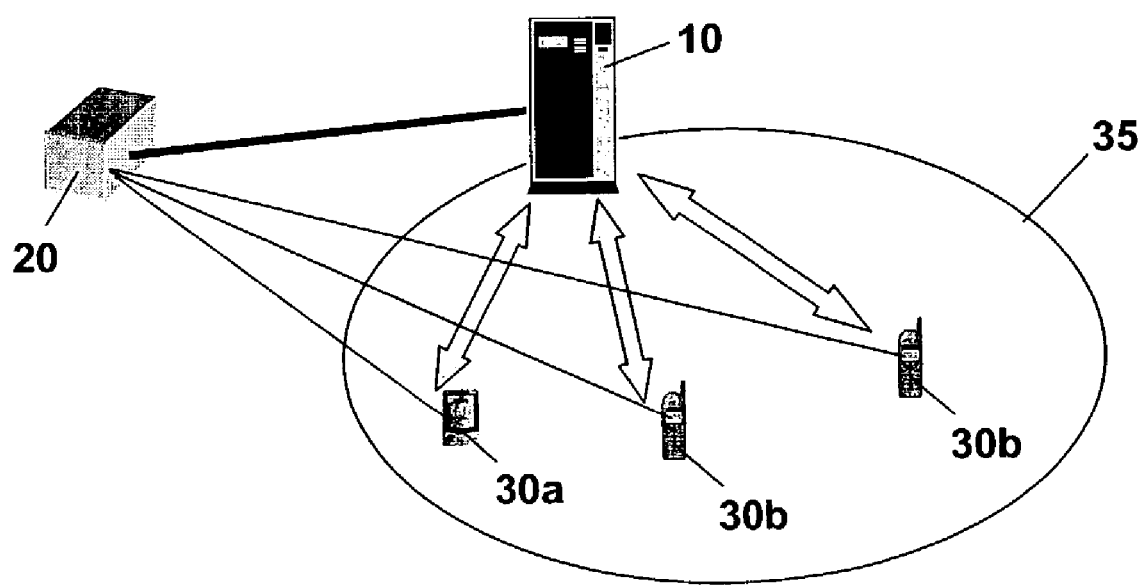
FIG. 1 is a network topology view showing a group rendezvous conferencing system in accordance with the invention in a mobile network environment.

Turning now to FIG. 1, an exemplary embodiment of the invention can be embedded in a GRCS (Group Rendezvous Conferencing System) Server (10) that supports an implementation of effective instant group conferencing in accordance with the invention to conference participants operating mobile devices (e.g., devices 30a, 30b, 30c, etc.) as mobile subscribers in a mobile Network (35). The GRCS server (10) performs negotiations on behalf of the participants to schedule conferences using an automated rendezvous mechanism as summarized above. A Conferencing Server (20) is utilized to setup the actual conference call between the mobile participants once the conference negotiations are completed.

As described in more detail below, the GRCS Server (10) can be implemented to provide a number of features that facilitate improved instant group conferencing when compared to conventional conferencing solutions. Advantageously, the GRCS Server (10) is capable of interfacing with any instant conferencing system that supports group dialing out to participants to include them in a conference call. Yet it overcomes the shortcomings of existing instant conferencing systems that rely solely on the pre-call published availability of participants to determine their commitment to participate in a conference call. As described by way of background above, availability indicators are not necessarily up to date and may not accurately reflect the current state of users. Thus, for an instant conference to be guaranteed, pre-call availability information is useful but may not be enough. To address the cases where availability information does not guarantee an agreement from all required participants to participate in a conference call at the specified conference time, the GRCS Server (10) can obtain an explicit commit from all (or a minimum number of) required participants.

The GRCS Server (10) allows a conference call originator to initiate and setup instant group conferencing to a set of participants even when the participants may not be immediately available to commit to the conference call at the time of its initiation. All negotiations for obtaining commitments from the participants are performed by the GRPS Server (10), thus relieving the originator of the time consuming task of negotiating with the participants. The system automatically determines when to actually dial out to the participants to setup the conference call after obtaining commitment from all (or a minimum number of) the required participants.

Conference participants are provided with enough context about the pending (but not yet setup) conference call to help the participants make an informed decision as to how to handle the conference invitation. This context is available at any time during the invitation, while the conference is pending, and is also available during the conference to uncommitted participants in case they decide to join the conference later. The context includes information on the other (potential) participants in the conference call, their current willingness to participate in the conference call, and the state of the conference itself such as the remaining maximum pending time, established or pending, etc.

Conference participants are further provided with an interactive and effective way of indicating to the system their willingness to participate in the pending conference call. Based on each participant's preferences and device capabilities, the GRCS Server (10) can employ the most desirable non-intrusive mode of communication and method of interaction with the participants, such as SMS/WAP/J2ME text or graphics display.

A conference originator can specify a time window from the time the conference is initiated within which the system must setup the conference call by dialing out to all (or a minimum number of) required conference participants. This limits the time a conference participant's telephone is tied up while the participant is waiting for the pending conference call to begin. The conference originator can also ask to be notified in case the system is not able to setup the conference call within the specified time window. The GRCS Server (10) will try to obtain commitments (or declines) from the participants within the specified time window. Absent sufficient commitments from the participants, the conference call setup is canceled and the committed participants are informed non-intrusively unless the conference originator requested a notification, in which case the GRCS Server (10) allows the originator to establish the conference anyway with the participants that committed to participate in the conference call.

Each conference participant, at any time before the conference call is started, can explicitly commit to, un-commit to, or decline the conference call in a non-intrusive manner. The GRCS Server (10) provides reminders to the participants regarding the pending conferences in which they are invited. The GRCS Server (10) also lets the conference participants look at the current commit state of other participants or invitees for the same pending conference. Once the conference is established, the system allows all the uncommitted participants (who were not initially included in the conference call) to join the conference at any time while the conference is ongoing.

Figure 2:
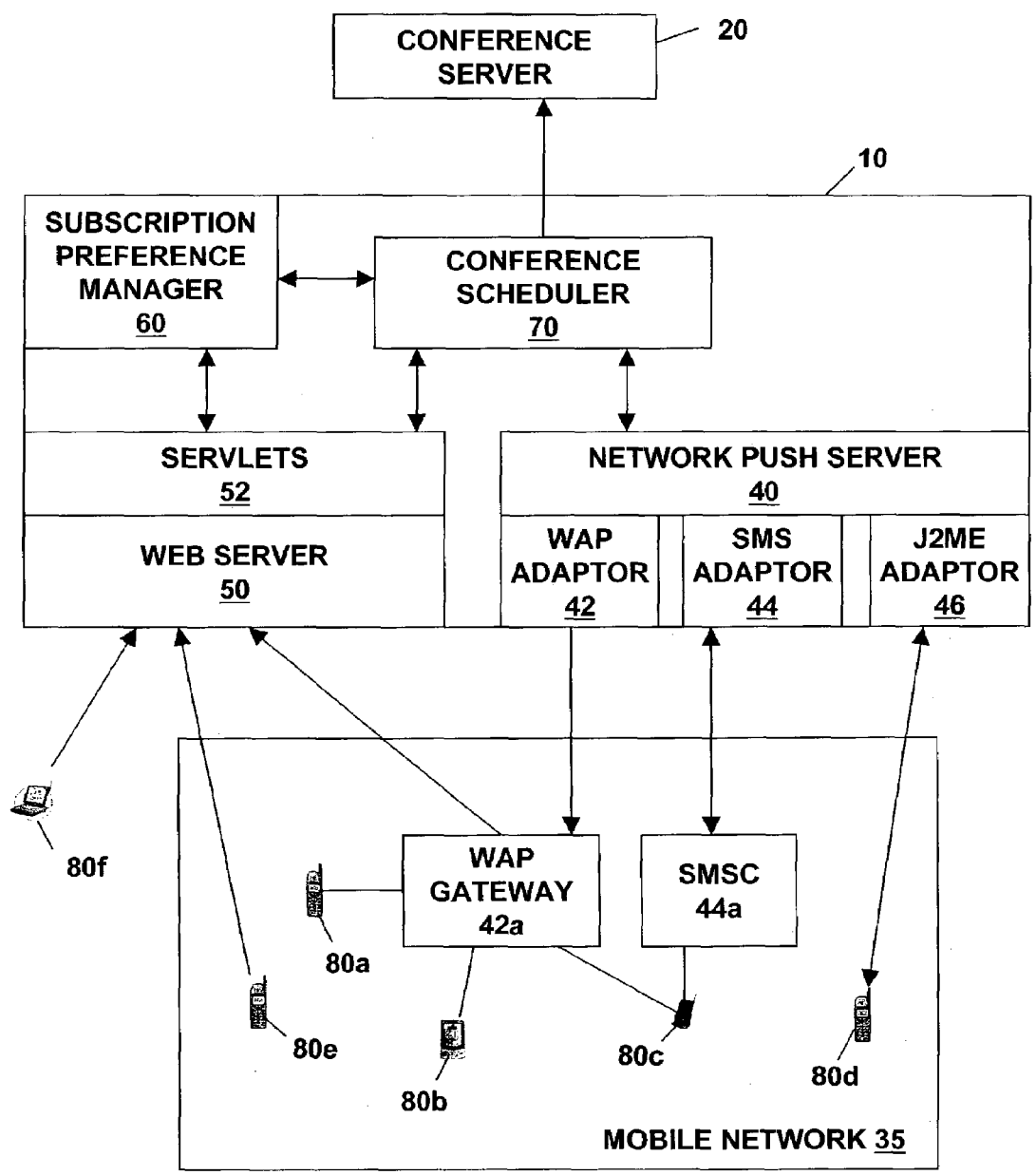
FIG. 2 is a functional block diagram showing details of the group rendezvous conferencing system of FIG. 1.

An exemplary architecture of the GRCS Server (10) is shown in FIG. 2. The functional components include a Network Push Server (40), a GRCS Web Server (50), a Subscription/Preference Manager (60), and a Conference Scheduler (70).

The Push Server (40) represents one possible embodiment of an information disseminating interface whose purpose is to send conference invitations and other conference-related information to conference participants. In the exemplary configuration of FIG. 2, the Push Server (4) is shown to implement a Wireless Application Protocol (WAP) adaptor (42), a Short Message Service (SMS) adaptor (44), and a Java 2 Micro Edition (J2ME) adaptor (46) to support different mobile device capabilities, types and protocols. The WAP adaptor (42) uses a WAP gateway (42a) to push WAP messages to mobile devices running WAP clients (e.g., mobile devices 80a and 80b) in the Network (35). The SMS adaptor (44) interfaces with a Short Message Service Center (SMSC) (44a) to send SMS messages to mobile devices equipped for SMS messaging (e.g. mobile device 80c). The J2ME adaptor (46) supports the ability to push messages to mobile devices running Java clients (e.g. mobile device 80d). It will be appreciated that additional adaptors could be added if other methods of communication are desired.

The Web Server (50) represents one possible embodiment of a GRCS subscriber access interface whose purpose is to allow authorized mobile users access to the instant group conferencing service provided by the GRCS Server (10) and to support the provisioning of GRCS subscriber information. In the exemplary configuration of FIG. 2, the Web Server (50) hosts Servlets (52) (or other appropriate server-side software) to assist in providing the required functionality.

Relative to conferencing service access, the Web Server (50) enables provisioned subscribers to provide information that allows them to participate in a conference (e.g., accepting or declining conference requests, etc.). In addition, provisioned subscribers can originate conferences by making conference call requests. The servlets (52) running in the Web Server (50) pass all conference-related information provided by subscribers to the Conference Scheduler (70).

Relative to provisioning, the Web Server (50) provides an HTML (HyperText Markup Language) interface that authorized mobile users can interact with to provision subscriber information, such as subscriber device information and preferences regarding preferred modes of communication, subscriber availability to communicate, etc. The servlets (52) running in the Web Server (50) store this information in the Subscription Preference Manager (60). Devices other than those used for conferencing, such as a mobile device (80*e*) running a Java client or a laptop computer (80*f*) may also communicate with the Web Server (50) for subscriber provisioning purposes. All of the user devices (80*a*-80*f*) shown in FIG. 2 can thus variously access the Web Server (50) via a direct HTML interface (e.g. devices 80*d*, 80*e* and 80*f*), via the WAP gateway 42*a* (e.g. WAP clients 80*a*, 80*b*, 80*c*), or using any other suitable communication method now in existence or to be developed in the future.

The Subscription Preference Manager (60) maintains a database of all provisioning information provided by subscribers via the Web Server (50). As indicated, this may include subscriber device information and preferences regarding preferred modes of communication, subscriber availability to communicate, etc. The Subscription Preference Manager (60) also contains the logic required to perform subscriber authentication and authorization. It further allows subscribers to publish their availability for voice communication as a subscriber "preference."

The Conference Scheduler (70) incorporates the logic for instant group conferencing, including auto-negotiation with conference participants and maintaining contexts for pending conferences. As indicated, a provisioned GRCS subscriber can provide conference participation information to the Conference Scheduler (70) via a client device (e.g. 80*a*, 80*b*, 80*c*, etc.) interacting with the Web Server (50) and its servlets (52). A provisioned subscriber can also originate an instant group conference in this manner. Using an HTML interface provided by the Web Server (50), the conference originator selects the participants of the conference call (who may not necessarily all be provisioned GRCS subscribers), specifies a time window within which the conference call must be setup, optionally requests a notification if the system is not able to set up the conference call within specified time window, and sets a criterion regarding the number of required participants before initiating the conference call. The conference call request is then handed over to the Conference Scheduler (70), which initiates the rendezvous negotiations for the conference call with the participants.

The Conference Scheduler (70) sends invitations to conference participants (invitees identified by a conference originator) using the Network Push Server (40). The Network Push Server (40) provides an interface (protocol converter) between the conference scheduler (40) and one or more of the protocol-specific adaptors (42, 44, 46) to facilitate the sending of invitations to the various mobile devices associated with the participants. As indicated, the Conference Scheduler (70) also collects the received responses for the conference invitees who are GRCS subscribers via the servlets (52) on the Web Server (50).

The logic in the Conference Scheduler (70) thus uses a combination of pushing information to mobile devices and obtaining response information to maintain and update the current contexts locally within the GRCS server (10). Whenever possible, context information regarding the pending conference may also be stored remotely on the mobile devices (e.g. using a J2ME client such as that associated with the client device (80*d*)). On obtaining a commitment from all (or a minimum number) of the required conference participants, within a specified time window, the Conference Scheduler (70) initiates setup of the conference call by calling upon the Conference Server (20), which can be implemented as a conventional "dial-out" conference server system.

Figure 3:
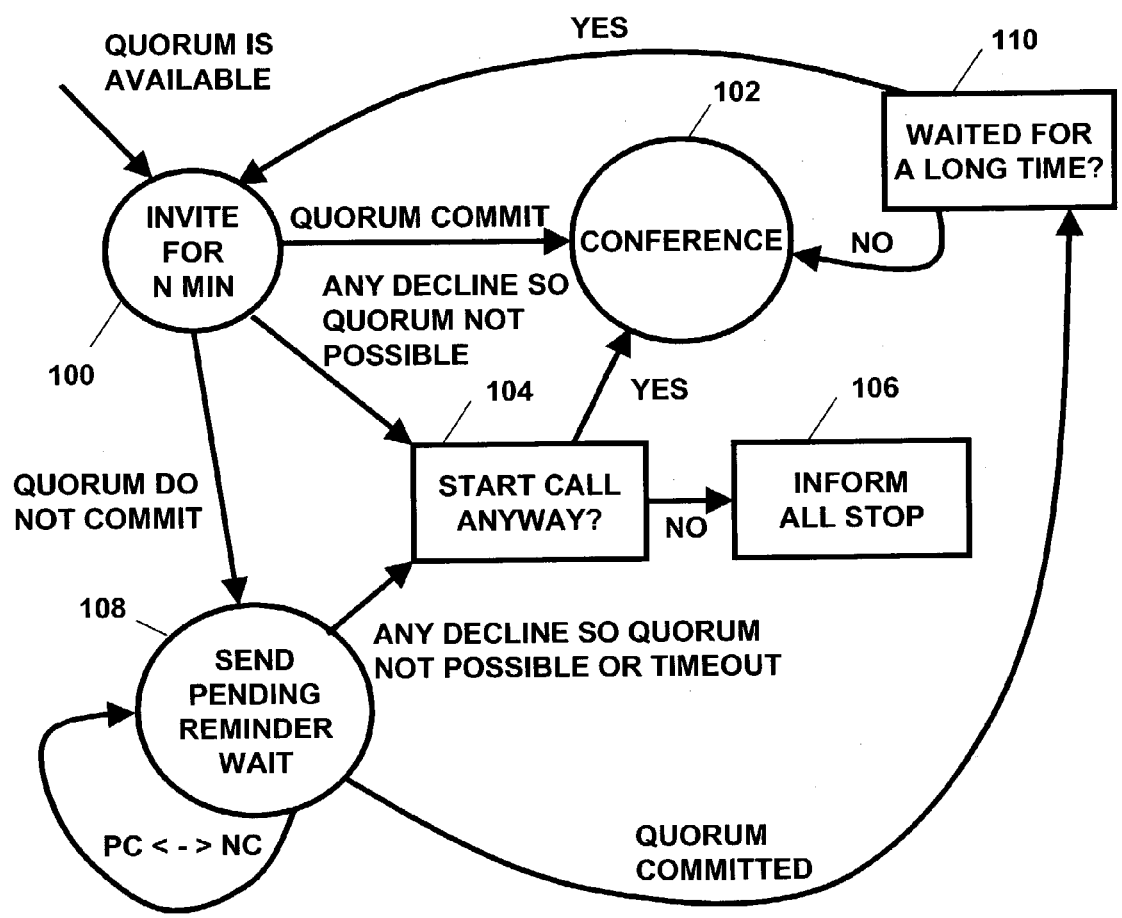
FIG. 3 is a state diagram showing conference setup logic implemented by the group rendezvous conferencing system of FIGS. 1 and 2.

An exemplary state diagram of the Conference Scheduler (70) during the setup of an instant group conference call is shown in FIG. 3. The logic flow of this state diagram will be described according to two cases. In Case I, all participants are assumed to be provisioned in the GRCS server (10), i.e., they are GRCS subscribers. In Case II, the model is extended to include non-provisioned conference participants as well.

Case 1: All Participants Are GRCS Subscribers Provisioned in the GRCS Server (10)

Case 1 assumes that one or more GRCS subscribers have received notification of a conference (date, time, subject, etc.) and have published their availability information. It is also assumed that if the GRCS subscribers publish their availability, the Conference Scheduler (70) should only initiate instant group conferencing when a quorum of the participants who publish their availability are deemed available (they have some chance of accepting the conference call) by the system. It is assumed for purposes of the present discussion that the required availability quorum is present and that the logic state of the Conference Scheduler (70) is entered via the "Quorum is Available" condition. This is the point when a quorum of participants with published availability have at least some chance of accepting a conference call, and the conference originator can request that the conference call go forward. In the following discussion for Case 1, it is also assumed that the conference originator has requested that the Conference Scheduler (70) provide a notification in case the system is unable to schedule the conference call within a specified time window.

At conference time, and assuming the "Quorum is Available" state has been reached, the Conference Scheduler (70) enters the "Invite for N Min" state (100). In state (100), the conference originator has already specified the parameters for the conference call: e.g. the participants, the time window, etc. In this state, a conference invitation is sent to each participant. The Conference Scheduler (70) uses the Network Push Server (40), which in turn implements one or more of its protocol-specific adaptors (e.g., 42, 44, 46) depending on the subscriber preference-defined mobile devices, to send conference invitations to the conference participants. For example, on a J2ME-enabled mobile device (e.g., mobile device (80*d*)), the invitation could lead to the display of a menu with two choices and the participant would select one of the two menu choices to accept or decline the conference.

Participants respond to the conference invitation either to accept ("commit") or to not accept ("decline") the invitation. The participant's action leads to the response coming back to the Conference Scheduler (70) via the Servlets (52) on the Web Server (50). The Conference Scheduler (70) waits for a predetermined invitation time period to receive responses back from the participants. If no response is obtained within the invitation time period from any given participant, that participant is designated as being not committed (NC).

As the Conference Scheduler (70) obtains responses from the participants, it checks if it has enough information to make a decision on how to proceed with the conference call.

If all required participants (or the minimum quorum) "commit" to the conference, the conference call is initiated between those that committed. This is the "Conference" state (102) in FIG. 3. Note that the criteria to decide when a quorum of participants has committed can vary from call to call and can be provided to the system as a parameter. A participant's commitment to the conference is referred to as a positive commit (PC). In state 102, any participants who did not decline the conference call, but did not commit either, may any time also join the established conference. If there are enough declines to prevent a conference commit quorum, the conference originator is informed and the "Start Call Anyway?" inquiry state 104 is reached. Note that a decline is an explicit decline, which is different from an NC condition. The originator can cancel the conference call at this point. Committed participants will be notified and the conference call will be aborted. This is the "Inform All Stop" state 106 in FIG. 3. State 104 also gives the conference originator an option to establish the conference call anyway with the participants who are committed. In that case, the conference is established and state 102 is invoked. If the conference originator does not respond to the "Start Call Anyway?" notification within 10 seconds (or some other predetermined time period), the conference is canceled and state 106 is invoked to notify committed participants.

If, in state 100, the required number of available participants do not commit to the conference (e.g., assume one or more is NC) after some period of time, a conference pending reminder is sent to each participant showing the current pending status (when possible) and how long the conference call will be kept pending. This message is persistent and stays (e.g., in a client mailbox) until removed. This is the "Send Pending Reminder Wait" state 108 in FIG. 3. In state 108, any participant may at any time, either explicitly (1) Decline (2) Uncommit (NC) or (3) Commit (PC). Also in this state, the Conference Scheduler periodically compares the number of committed participants (PC) to the number of uncommitted participants (NC) to test for the presence of a commit quorum.

If, in state 108, any participant declines (or becomes unavailable) and no quorum can be achieved, the Conference Scheduler enters state 104. If, in state 108, a participant uncommits (changes to NC), the new status is noted but no change of state occurs. This allows, for example, someone to temporarily become unavailable voluntarily or involuntarily for a pending conference call (e.g., the participant takes a break, gets a call on the phone, loses radio coverage, etc.). If, in state 108, a participant commits (changes to PC) but there still is no quorum of committed participants, the new status is noted but no change of state occurs. If, in state 108, the elapsed time since the origination of the conference call exceeds the originator's specified time window, there is a timeout and the system enters state 104. If a quorum of commits is achieved, the time the conference call was kept pending is checked in state 110. If this time is less than some configurable parameter, the conference call is initiated. Otherwise, state 100 is entered and a reconfirmation is obtained from committed participants by sending out a new set of invitations.

Case 2: Some of the Participants Are Not Provisioned as GRCS Subscribers

In Case 2, the above steps for Case 1 are implemented for all conference participants who are active GRCS subscribers. Then, at the time the conference call is setup, the GRCS Server (10) can request that the Instant Conference Server (20) dial out to all participants who are not GRCS subscribers as part of the conference setup. Alternatively, an SMS-based conference invitation could be sent to any user that can handle two-way SMS communication. A J2ME-based conference invitation could also be sent to any user that runs a compatible Java client. Responses to such invitations can be respectively received via the SMS Adaptor (44) and the J2ME Adaptor (46).

Accordingly, a method and system have been disclosed for supporting automated mobile instant group conferencing with participant rendezvous. While various embodiments of the invention have been shown and described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for enhancing instant group conferencing using an automated rendezvous mechanism, comprising:
    receiving a conference call request from a conference originator;
    sending out conference invitations to one or more conference participants;
    testing for responses to said conference invitations over the course of a predetermined invitation period;
    setting up a conference call upon obtaining a quorum of conference commitments from said conference participants, wherein conference participants who commit to said conference are allowed to toggle between committed and un-committed response states during said invitation period;
    sending conference reminders to said conference participants during said invitation period if there is no quorum of said conference participants committed to said conference;
    following sending of said conference reminders, responding to a quorum-defeating number of said conference participants declining said conference or expiration of said invitation period by prompting said conference originator to set up said conference call in response to a quorum-defeating number of said conference participants declining said conference regardless of the absence of a quorum of committed participants; and
    advising all of said conference participants that said conference is being terminated upon said conference originator responding to said prompting by requesting that said conference call not proceed.

2. A method in accordance with claim 1 wherein said conference invitations include conference context information that includes one or more of an identification of other conference participants, an identification of invitation response states for other conference participants, and status of said conference.

3. A method in accordance with claim 1 wherein said conference reminders include information as to the status of said conference and how long said conference will remain pending.

4. A method in accordance with claim 1 further including, following sending of said conference reminders, responding to a quorum of said conference participants committing to said conference and said invitation period not having expired by setting up said conference call.

5. A method in accordance with claim 1 further including allowing additional conference participants to join said conference after said conference call has been setup.

6. A conferencing system for providing enhancing instant group conferencing using an automated rendezvous mechanism, comprising:

a subscriber access interface adapted to receive a conference call request from a conference originator and conference participation information from conference participants;

an information disseminating interface adapted to send conference invitations to one or more of said conference participants; and a conference scheduler adapted to test responses to said conference invitations over the course of a predetermined invitation period and to initiate set up of a conference call upon obtaining a quorum of conference commitments from said conference participants, wherein said conference scheduler is further adapted to:

allow conference participants who commit to said conference to toggle between committed and un-committed response states during said invitation period;

initiate the sending of conference reminders to said conference participants during said invitation period if there is no quorum of said conference participants committed to said conference;

respond, following sending of said conference reminders, to a quorum-defeating number of said conference participants declining said conference or expiration of said invitation period by prompting said conference originator to set up said conference call in response to a quorum-defeating number of said conference participants declining said conference regardless of the absence of a quorum of committed participants; and initiate notification of all of said conference participants that said conference is being terminated upon said conference originator responding to said prompting by requesting that said conference call not proceed.

7. A system in accordance with claim 6 wherein said conference invitations include conference context information that includes one or more of an identification of other conference participants, an identification of invitation response states for other conference participants, and status of said conference.

8. A method in accordance with claim 6 wherein said conference reminders include information as to the status of said conference and how long said conference will remain pending.

9. A method in accordance with claim 6 wherein said conference scheduler is further adapted to respond, following sending of said conference reminders, to a quorum of said conference participants committing to said conference and said invitation period not having expired by setting up said conference call.

10. A system in accordance with claim 6 wherein said conference scheduler is further adapted to allow additional conference participants to join said conference after said conference call has been set up.

11. A conferencing system providing enhanced instant group conferencing using an automated rendezvous mechanism, comprising:

a web server with associated servlets, said web server being adapted to receive a conference call request from a conference originator and conference participation information from conference participants;

a push server with associated protocol-specific communication adaptors, said push server being adapted to send conference invitations to one or more of said conference participants; and a conference scheduler adapted to test responses to said conference invitations over the course of a predetermined invitation period and to initiate set up of a conference call upon obtaining a quorum of conference commitments from said conference participants;

a subscription preference manager adapted to store preferences of conferencing system subscribers;

said conference scheduler being further adapted to allow conference participants who commit to said conference to toggle between committed and un-committed response states during said invitation period;

said conference invitations including conference context information that includes one or more of an identification of other conference participants, an identification of invitation response states for other conference participants, and status of said conference;

said conference scheduler being further adapted to prompt said conference originator to set up said conference call in response to a quorum-defeating number of said conference participants declining said conference regardless of the absence of a quorum of committed participants;

said conference scheduler being further adapted to initiate notification of all of said conference participants that said conference is being terminated upon said conference originator responding to said prompting by requesting that said conference call not proceed;

said conference scheduler being further adapted to initiate the sending of conference reminders to said conference participants during said invitation period if there is no quorum of said conference participants committed to said conference;

said conference reminders including information as to the status of said conference and how long said conference will remain pending;

said conference scheduler being further adapted to respond, following sending of said conference reminders, to a quorum-defeating number of said conference participants declining said conference or expiration of said invitation period by prompting said conference originator to set up said conference call in response regardless of the absence of a quorum of committed participants;

said conference scheduler being further adapted to respond, following sending of said conference reminders, to a quorum of said conference participants committing to said conference and said invitation period not having expired by setting up said conference call; and said conference scheduler being further adapted to allow additional conference participants to join said conference after said conference call has been set up.

12. A method in accordance with claim 1, wherein said conference call request comprises:

a time period representing said predetermined invitation period in which to monitor said responses to said conference invitations; and a number representing said quorum of conference commitments required to set up said conference call.

13. A conferencing system in accordance with claim 6, wherein said conference call request comprises:

a time period representing said predetermined invitation period in which to monitor said responses to said conference invitations; and a number representing said quorum of conference commitments required to set up said conference call.

* * * * *

UNITED STATES PATENT AND TRADEMARK OFFICE
CERTIFICATE OF CORRECTION

| | | |
|---|---|---|
| PATENT NO. | : 7,602,893 B2 | Page 1 of 1 |
| APPLICATION NO. | : 10/431338 | |
| DATED | : October 13, 2009 | |
| INVENTOR(S) | : Bhatia et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1587 days.

Signed and Sealed this

Fifth Day of October, 2010

David J. Kappos
*Director of the United States Patent and Trademark Office*